(12) United States Patent
Hariki et al.

(10) Patent No.: US 8,630,736 B2
(45) Date of Patent: Jan. 14, 2014

(54) CONVEYING DEVICE FOR ROD

(75) Inventors: Kazuo Hariki, Yamanashi (JP);
Shigenori Kajio, Yamanashi (JP);
Takaki Aiba, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 148 days.

(21) Appl. No.: 13/398,944

(22) Filed: Feb. 17, 2012

(65) Prior Publication Data

US 2012/0213623 A1     Aug. 23, 2012

(30) Foreign Application Priority Data

Feb. 21, 2011   (JP) .................................. 2011-034413

(51) Int. Cl.
| | | |
|---|---|---|
| G05B 19/04 | (2006.01) | |
| G05B 19/18 | (2006.01) | |
| G06F 7/00 | (2006.01) | |
| G06F 19/00 | (2011.01) | |

(52) U.S. Cl.
USPC ........... 700/259; 700/253; 700/258; 700/220; 700/112; 700/213; 901/40; 901/46; 901/50

(58) Field of Classification Search
None
See application file for complete search history.

(56) References Cited

U.S. PATENT DOCUMENTS

| | | | | |
|---|---|---|---|---|
| 4,266,905 A * | 5/1981 | Birk et al. | ..................... | 414/627 |
| 5,446,835 A | 8/1995 | Iida et al. | | |
| 6,293,006 B1 * | 9/2001 | Takeda et al. | ................... | 29/832 |
| 6,748,649 B2 * | 6/2004 | Okuda et al. | ..................... | 29/740 |
| 7,313,464 B1 * | 12/2007 | Perreault et al. | .............. | 700/245 |
| 7,657,346 B2 * | 2/2010 | Ban et al. | ...................... | 700/262 |
| 2004/0186624 A1 * | 9/2004 | Oda et al. | ..................... | 700/245 |
| 2005/0246890 A1 * | 11/2005 | Isogai et al. | ..................... | 29/740 |
| 2006/0184282 A1 * | 8/2006 | Strasser et al. | ................ | 700/258 |
| 2006/0247813 A1 * | 11/2006 | Takahashi | ....................... | 700/95 |
| 2007/0169231 A1 * | 7/2007 | Zhang et al. | ..................... | 901/31 |
| 2010/0004778 A1 * | 1/2010 | Arimatsu et al. | ............. | 700/214 |
| 2010/0324737 A1 | 12/2010 | Handa et al. | | |

FOREIGN PATENT DOCUMENTS

| | | |
|---|---|---|
| DE | 4236813 A1 | 5/1993 |
| JP | 4093191 A | 3/1992 |
| JP | 4348887 A | 12/1992 |
| JP | 2007-185735 A | 7/2007 |
| JP | 2011-022133 A | 2/2011 |

OTHER PUBLICATIONS

A JP Office Action dated Jun. 12, 2012 issued in JP Application No. 2011-034413.
Office Action issued by the German Patent Office on Nov. 26, 2012 in corresponding German Application No. 102012002914.4, with English translation.

* cited by examiner

*Primary Examiner* — Khoi Tran
*Assistant Examiner* — Bao Long T Nguyen
(74) *Attorney, Agent, or Firm* — Lowe Hauptman & Ham LLP

(57) ABSTRACT

A conveying device capable of sequentially and efficiently picking up a plurality of randomly located rods, and conveying the picked up rod to a predetermined place, without using a complicated mechanism. A sucking unit has a nozzle attached to a robot hand, and is configured to move the nozzle close to an end of a first cylindrical portion of a rod to be picked. The nozzle is configured to hold the rod by being lifted while sucking the first portion within the nozzle.

5 Claims, 4 Drawing Sheets

CONVEYING DEVICE FOR ROD

RELATED APPLICATIONS

The present application is based on, and claims priority from, Japanese Application Number 2011-034413, filed Feb. 21, 2011, the disclosure of which is hereby incorporated by reference herein in its entirety.

BACKGROUND OF THE INVENTION

1. Field of the Invention

The present invention relates to a conveying device for a rod, in particular, to a conveying device configured to sequentially pick up a plurality of randomly piled rods by using a robot and conveying the picked up rods to a predetermined place.

2. Description of the Related Art

In sequentially picking up and conveying a plurality of rods, which are randomly piled on a pallet or a conveyor, by using a robot, conveying efficiency and cost of the operation are varied depending on where the robot grips or sucks the rod. For example, Japanese Unexamined Patent Publication (Kokai) No. 4-93191 discloses a configuration wherein a rod-shaped workpiece 22 in a box is electromagnetically attracted and picked up by using a robot hand 62 attached to a robot wrist element via a floating mechanism 91.

Further, Japanese Unexamined Patent Publication (Kokai) No. 4-348887 discloses a configuration wherein a rod "A" is gripped by a gripper 4 provided on a front end of a robot arm 1, and inserted into a spool hole "C" while being spirally moved.

In the method of Japanese Unexamined Patent Publication (Kokai) No. 4-93191 wherein the lateral side of the rod is attracted, it is necessary to use a mechanism for gripping one end of the rod and regrip the rod by using the mechanism, in order to convey the rod in a vertical state. Further, it is necessary to use a floating mechanism for avoiding a mistake when gripping due to a small positional error between the rod and the robot hand. Such a floating mechanism is not cost efficient.

On the other hand, in the method of Japanese Unexamined Patent Publication (Kokai) No. 4-348887 wherein one end of the rod is gripped by means of a chuck or the like, it is necessary that each supplied rod is previously positioned in a vertical state. Therefore, the applicable range of this method is limited. Further, in the method, it is difficult to pick up the rods one-by-one among a plurality of randomly piled (or closely-spaced) rods.

SUMMARY OF THE INVENTION

An object of the present invention is to provide a conveying device capable of sequentially and efficiently picking up a plurality of randomly located rods, and conveying the picked up rod to a predetermined place, without using a complicated mechanism.

According to the present invention, there is provided a conveying device configured to pick up a plurality of the same kind of rods which are randomly located, and convey the picked up rod to a predetermined place using a robot, the conveying device comprising: a first detecting unit configured to detect a position and orientation of at least a rod to be picked up, among the plurality of rods; a sucking unit having a nozzle with an inner diameter larger than an outer diameter of at least one end of the rod, the nozzle being configured to suck and hold the rod; and a robot having a robot arm and a robot hand attached to a front end of the robot arm, the nozzle being attached to the robot hand, wherein the robot is configured to hold the rod by sucking at least a portion of the rod from one end of the rod along a longitudinal direction thereof by using the nozzle, based on the position and orientation of the rod detected by the first detecting unit, and convey the held rod to a predetermined place.

In a preferred embodiment, a suction direction of the rod by the nozzle is determined based on the position and orientation of the rod detected by the first detecting unit, and wherein the nozzle is raised while sucking the rod, whereby the rod is at least partially sucked within the nozzle and conveyed to the predetermined place in a vertical state.

In a preferred embodiment, the conveying device further comprises a second detecting unit configured to detect the rod which is sucked and held by the nozzle, wherein the robot is configured to locate the rod at a predetermined rotational position, based on positional information of the rod detected by the second detecting unit while the rod is sucked and held by the nozzle, and convey the held rod to the predetermined place.

In a preferred embodiment, the conveying device further comprises a second detecting unit configured to detect the rod which is sucked and held by the nozzle, wherein the robot is configured to obtain information of the rod detected by the second detecting unit while the rod is sucked and held by the nozzle, determine a place where the rod is to be conveyed corresponding to the obtained information, and convey the held rod to the determined place.

In a preferred embodiment, the second detecting unit is a second vision sensor.

In a preferred embodiment, wherein the first detecting unit is a first vision sensor.

BRIEF DESCRIPTION OF THE DRAWINGS

The above and other objects, features and advantages of the present invention will be made more apparent by the following description of the preferred embodiments thereof with reference to the accompanying drawings wherein.

DETAILED DESCRIPTION

Figure 1:
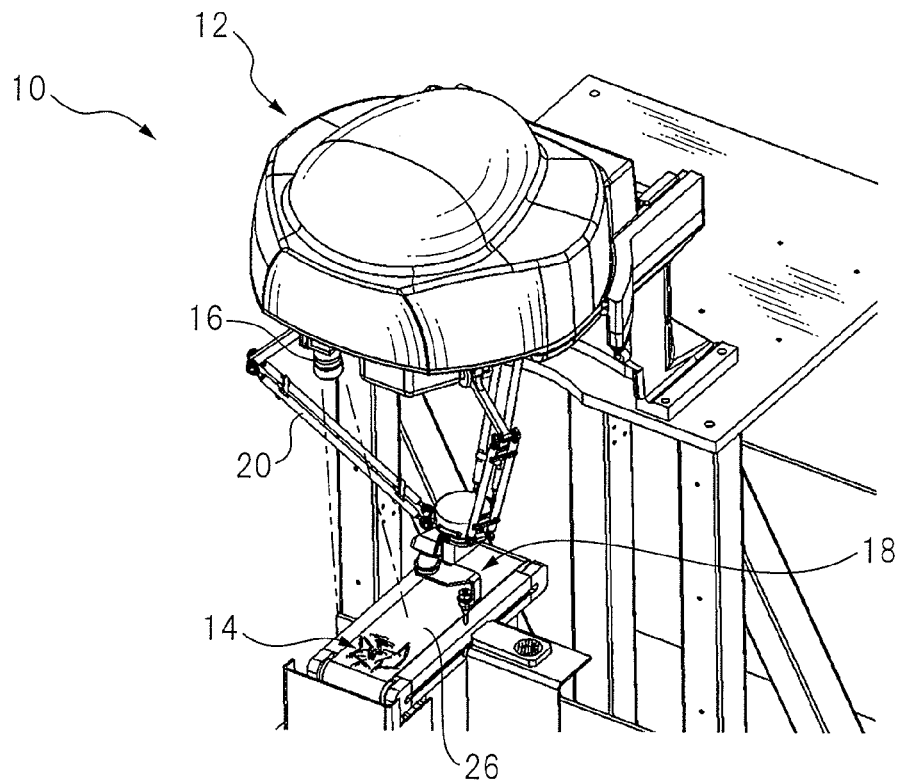
FIG. 1 shows a conveying device according to an embodiment of the invention, wherein a first detecting unit detects a rod.

FIG. 1 shows a schematic configuration of a conveying device 10 according to the present invention.

Conveying device 10 includes a robot 12 and a first detecting unit 16 capable of detecting a plurality of (in the drawings, same kinds of) rods 14 which are randomly located. Robot 12 has a sucking unit 18 configured to sequentially sucking and picking up rods 14. Concretely, sucking unit 18 has a nozzle 24 (see FIG. 2) attached to a robot hand 22 arranged at a front end of a robot arm 20, and a vacuum unit (not shown) connected to nozzle 24 via a pipe or a tube so as to reduce the pressure within nozzle 24 to negative pressure. Nozzle 24 is a cylindrical portion having an inner diameter which is larger than an outer diameter of at least one end of rod 14, and the position and orientation of nozzle 24 are adjustable since nozzle 24 is attached to robot hand 22. Nozzle 24 is configured to sequentially (one-by-one in the illustrated embodiment) picking up rod 14, and suck and hold the picked rod.

First detecting unit 16 is configured to detect at least one (preferably, the entirety) of the plurality of rods 14 which are randomly located or piled. In FIG. 1, first detecting unit 16 is fixedly positioned at a lower surface of a body of robot 12. However, first detecting unit 16 may be attached to another place, for example, a movable part of the robot such as the robot arm, as long as the first detecting unit can detect the rod.

In the drawings, rods 14 are randomly located on a belt conveyor 26. In other words, each rod 14 is positioned so that a longitudinal axis thereof is generally horizontal. However, the present invention is not limited to such a case. For example, the rods may be randomly located on a pallet, or randomly piled in a box or a container.

Figure 3:
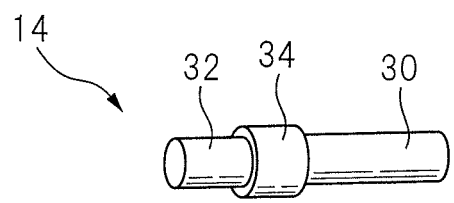
FIG. 3 shows an example of the configuration of the rod.

FIG. 3 is a diagram showing an example of the constitution of rod 14. Rod 14 has a first cylindrical portion 30 having an outer diameter which is smaller than an inner diameter of nozzle 24, second cylindrical portion 32 having an outer diameter which is smaller than an inner diameter of nozzle 24, and a third cylindrical portion 34 having an outer diameter which is larger than an inner diameter of nozzle 24. The axial length of second cylindrical portion 32 is smaller than the axial length of first cylindrical portion 30, and the first and second cylindrical portions are coaxially connected by means of third cylindrical portion 34. In the embodiment, first cylindrical portion 30 is to be sucked within nozzle 24 while rod 14 is conveyed. Since the outer diameter of third cylindrical portion 34 is larger than the inner diameter of nozzle 24, when the rod is correctly sucked and held by nozzle 24, first cylindrical portion 30 is positioned within nozzle 24, and second and third cylindrical portions 32 and 34 are positioned outside nozzle 24.

Next, a conveying procedure of rod 14 by means of conveying device 10 is explained with reference to FIGS. 1 to 5 and a flowchart of FIG. 6. First, as shown in FIG. 1, the position and orientation of each of rods 14, which are randomly located on conveyor 26, are detected by means of first detecting unit 16 (step S1). In relation to the detection of an object to be picked by means of first detecting unit 16, a detailed explanation is omitted since a conventional technique may be used. In one example of the detection method, all of the rods are imaged, the position and orientation of each rod are calculated by processing an obtained image, and one rod is selected so that an amount of change in the position and orientation of nozzle 24 is minimized (or a time for changing the position and orientation of the nozzle is minimized) when one of the rods is picked up. Further, when some rods overlap with each other, the upper rod is preferentially picked up.

Figure 2:
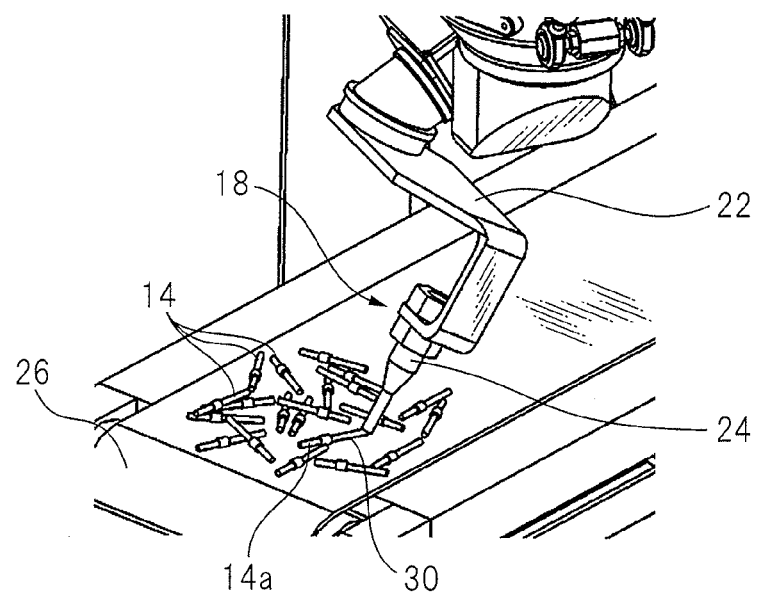
FIG. 2 shows a state wherein the rod is sucked by a nozzle attached to a robot hand.

After a rod to be picked is detected (step S2), robot 12 is controlled so that rod 14 to be picked is sucked and held by nozzle 24 (step S3), as shown in FIG. 2. Concretely, a front end of nozzle 24 is moved close to an end of first cylindrical portion 30 of rod (14*a* in this case) to be picked, a vacuum unit or the like (not shown) connected to nozzle 24 is activated to suck air from the front end of the nozzle, and first cylindrical portion 30 of rod 14*a* is sucked into nozzle 24 by suction force due to the air suction. While sucking first cylindrical portion 30, nozzle 24 is upwardly moved to hold rod 14*a*. Therefore, at least a portion (first cylindrical portion 30 in this case) of rod 14*a* is contained within nozzle 24 along the longitudinal direction thereof. Otherwise, if the rod has a simple column shape, all of the rod may be contained within the nozzle. Further, if the rod has a nail shape, a part of the rod other than a nailhead may be contained within the nozzle.

As shown in FIG. 2, in many cases, each rod is positioned so that the longitudinal direction thereof is generally horizontal. Therefore, it is preferable that nozzle 24 be moved close to the end of first portion 30 of rod 14*a* to be picked so that the longitudinal axis of rod 14*a* and the longitudinal axis of nozzle 24 (or a sucking direction) form an obtuse angle.

In addition, when the rod is not properly detected in step S2 (for example, a rod to be picked cannot be determined based on the given condition as described above), the procedure is returned to step S1 so that the detecting process is carried out again after modifying the condition.

Figure 4:
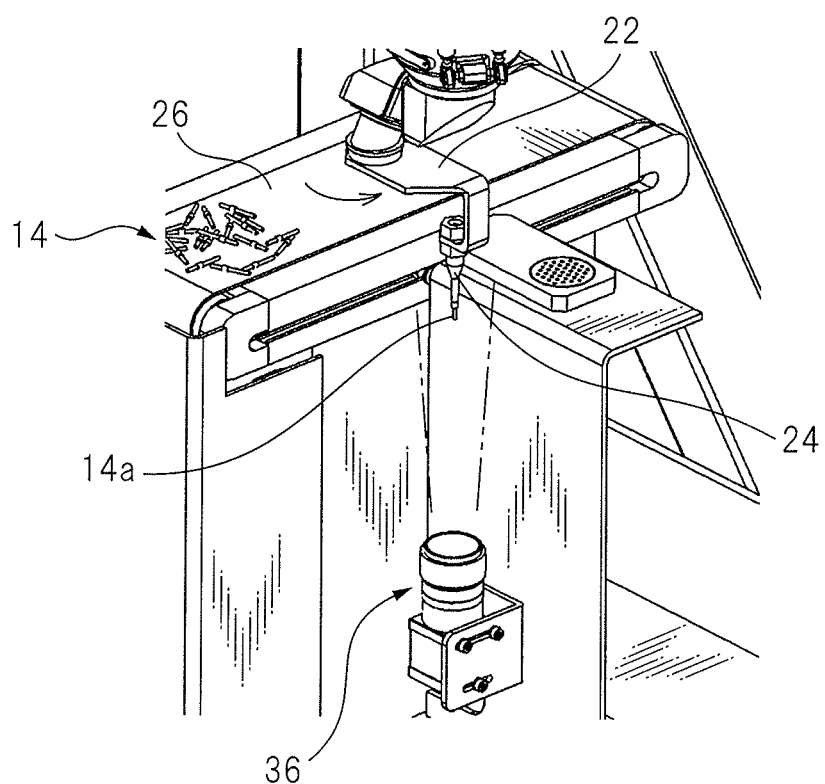
FIG. 4 shows a state wherein the rod sucked and held by the nozzle is detected by a second detecting unit.

Next to step S3, as shown in FIG. 4, rod 14*a*, sucked and held by nozzle 24, is detected by a second detecting unit 36 (step S4). In the embodiment of FIG. 4, the second detecting unit is a vision sensor fixedly positioned on a pedestal or the like located below nozzle 24, and is configured to capture an image of the rod sucked and held by nozzle 24. In this regard, as shown in FIG. 4, nozzle 24 and rod 14*a* sucked and held by nozzle 24 may be moved within a viewing field of second vision sensor 26 due to given motion (rotating motion in the embodiment) of the robot arm or robot hand 22.

In the next step S5, rod 14*a* sucked and held by nozzle 24 is detected. Concretely, it is detected whether nozzle 24 holds a rod or not, and the procedure progresses to step S6 when nozzle 24 holds a rod. Otherwise, when nozzle 24 does not hold a rod (i.e., the suction is failure), the procedure is returned to step S3 so as to retry the suction of the rod. In addition, if the detection fails due to problem, etc., of the second vision sensor, the procedure is returned to step S4 after eliminating a cause of the problem.

Next, in step S6, second vision sensor 26 detects whether rod 14*a* is sucked and held by nozzle 24 upside down, even though the rod is in a vertical state. In the embodiment, the outer diameter of each end (or first and second cylindrical portions 30 and 32) of rod 14*a* is smaller than the inner diameter of nozzle 24, and thus second cylindrical portion 32 may be disadvantageously sucked in nozzle 24. In such a case, the second detecting unit or vision sensor 36 can detect that the portion of the rod exposed outside of nozzle 24 is not second cylindrical portion 32. For example, it can be detected that the portion exposed outside of nozzle 24 is not second cylindrical portion 32, based on information including a detection result of a mark which is previously formed at the end of at least one of first portion 30 and second portion 32. Otherwise, the second vision sensor may be positioned at a place where the second vision sensor can capture an image of rod 14*a* from the lateral side of thereof, and the second vision sensor may detect the length of the portion of the rod exposed outside of nozzle 24 as information of the rod. In this case, the second vision sensor can detect that the length of the portion of the rod exposed outside of nozzle 24 is equal to a summation of third cylindrical portion 34 and relatively long first cylindrical portion 30, although the length of the portion of the rod exposed outside of nozzle 24 should be equal to a summation of third cylindrical portion 34 and relatively short second cylindrical portion 32.

As second detecting unit 36, a slit sensor or a length sensor using a laser beam may be used, instead of a vision sensor. Further, the second detecting unit may be attached to a movable part such as a robot arm, instead of being attached to a fixed place.

Figure 5:
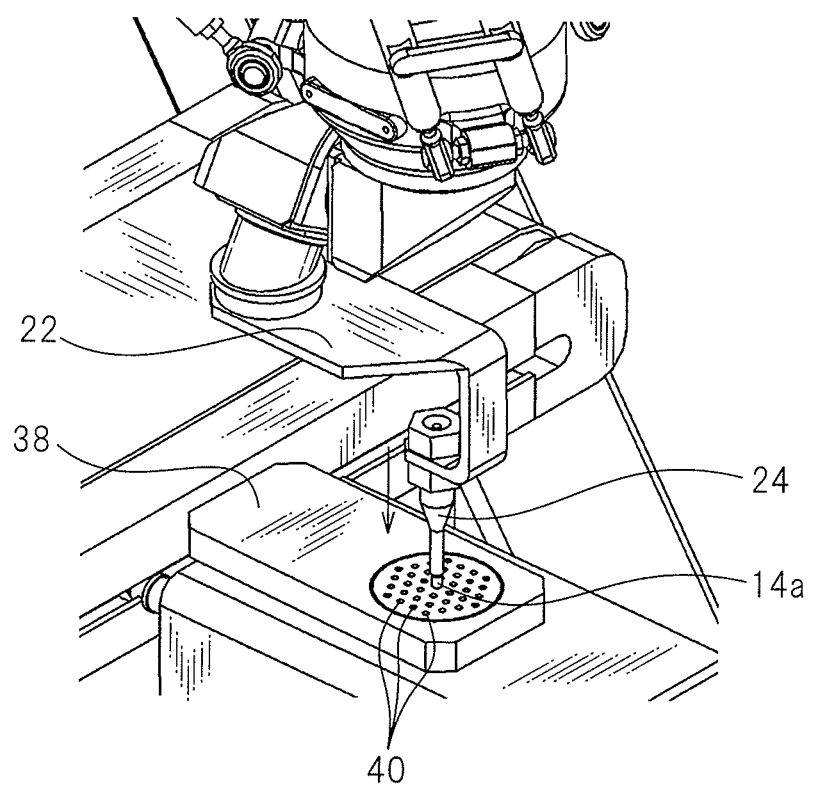
FIG. 5 shows a state wherein the rod sucked and held by the nozzle is conveyed to a predetermined place.
Figure 6:
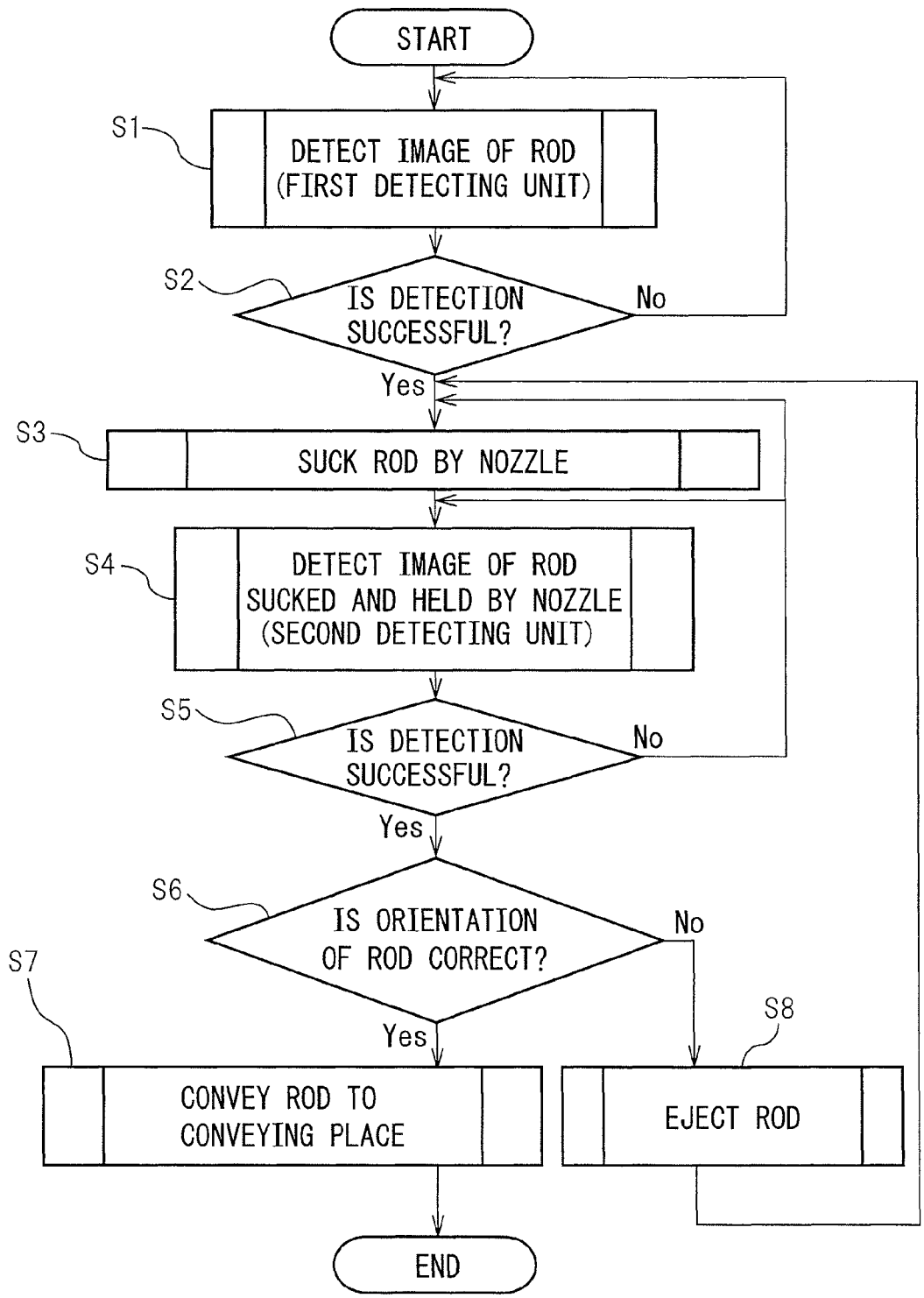
FIG. 6 is a flowchart indicating a conveying process of the rod using the conveying device according to an embodiment of the invention.

When second vision sensor 36 detects that the orientation of rod 14*a* held by nozzle 24 is correct (i.e., first portion 30 is positioned within the nozzle), the procedure progresses to step S7, as shown in FIG. 5, and the robot is activated to convey the held rod to a predetermined conveying place. In the embodiment of FIG. 5, the predetermined conveying place is a stand 38 arranged in a movable range of nozzle 24. Stand 38 has a plurality receiving holes 40 each configured to receive each second cylindrical portion 32 of rod 14 in the vertical direction. Then, as shown in FIG. 4, positional information of rod 14a sucked and held by nozzle 24 is detected by second vision sensor 36, and then rod 14a is positioned at a predetermined rotational position (in this case, above receiving hole 40 of stand 38 into which rod 14a should be inserted) based on the positional information. After that, nozzle 24 is lowered so that rod 14a is inserted into receiving hole 40.

As described above, in the embodiment, by postural control of robot hand 22, rod 14 sucked and held by nozzle 24 is moved to above stand 38 in the vertical orientation, and rod 14 may be inserted into receiving hole 40 in the vertical state by lowering nozzle 24 and stopping the suction of the rod. As such, in the present invention, the nozzle sucks and holds the rod from one end thereof in the longitudinal direction thereof. Therefore, the rod is easily conveyed in the vertical state by postural control of the robot hand, whereby working hours may be reduced relative to the prior art and production efficiency may be improved.

On the other hand, when the orientation of the rod sucked and held by the nozzle is incorrect (e.g., second portion 32 is positioned within the nozzle), the rod cannot be conveyed to stand 38 with the correct orientation. In this case, the rod is not conveyed to the predetermined place such as stand 38, and is conveyed to a place other than stand (step S8). For example, the rod may be returned to conveyor 26 or conveyed to another conveying place.

Although the same kind of rods are detected in the embodiment, different kinds of rods may be used. In this case, second vision sensor 38 may identify a kind of a rod sucked and held by the nozzle, based on a shape or a mark of the rod, and the rod may be conveyed to respective conveying place corresponding to the kind of the rod, based on information relating to the identified result.

Steps S1 to S7 or S8 as described above are repeated in relation to each rod. However, when a plurality of rods to be picked are detected in steps S1 and S2 and a picking order of the rods is determined, steps S1 and S2 may be omitted.

According to the present invention, the rod is sucked and held by the nozzle attached to the robot. Therefore, it is not necessary to precisely position the nozzle relative to the rod when picking the rod, and it is not necessary to provide a special structure such as a floating mechanism to the robot. Further, since it is not necessary to provide a complex unit for supplying the rods before the suction by the nozzle, an inexpensive conveying device may be constituted. By sucking and holding the rod by means of the nozzle, it is easy to convey the rod in the vertical state, whereby working hours may be reduced and a production efficiency may be improved, in comparison to the prior art.

By using the second detecting unit for detecting the rod sucked and held by the nozzle, the rod may be effectively conveyed. For example, the positioning of the rod may be carried out based on the position detected by the second detecting unit, and/or the conveying place to which the rod is to be moved may be changed corresponding to the state of the rod sucked and held by the nozzle.

By using a vision sensor as the first detecting unit, the position and orientation of the rod which is randomly located may be easily detected by image processing. Further, by using a vision sensor as the second detecting unit, the orientation and the kind of the rod which is sucked and held by the nozzle may be easily detected by image processing.

While the invention has been described with reference to specific embodiments chosen for the purpose of illustration, it should be apparent that numerous modifications could be made thereto, by a person skilled in the art, without departing from the basic concept and scope of the invention.

The invention claimed is:

1. A conveying device configured to pick up a plurality of the same kind of rods which are randomly located, and convey the picked up rod to a predetermined place using a robot, the conveying device comprising:
   a first detecting unit configured to detect a position and orientation of at least a rod to be picked up, among the plurality of rods;
   a sucking unit having a nozzle with an inner diameter larger than an outer diameter of at least one end of the rod, the nozzle being configured to suck and hold the rod; and
   a robot having a robot arm and a robot hand attached to a front end of the robot arm, the nozzle being attached to the robot hand,
   wherein the robot is configured to determine a suction direction of the rod by the nozzle based on the position and orientation of the rod detected by the first detecting unit, raise the nozzle while sucking the rod by the nozzle, at least partially suck the rod within the nozzle, and convey the rod to the predetermined place in a vertical state.

2. The conveying device as set forth in claim 1, further comprising a second detecting unit configured to detect the rod which is sucked and held by the nozzle, wherein the robot is configured to locate the rod at a predetermined rotational position, based on positional information of the rod detected by the second detecting unit while the rod is sucked and held by the nozzle, and convey the held rod to the predetermined place.

3. The conveying device as set forth in claim 1, further comprising a second detecting unit configured to detect the rod which is sucked and held by the nozzle, wherein the robot is configured to obtain information of the rod detected by the second detecting unit while the rod is sucked and held by the nozzle, determine a place where the rod is to be conveyed corresponding to the obtained information, and convey the held rod to the determined place.

4. The conveying device as set forth in claim 2, wherein the second detecting unit is a second vision sensor.

5. The conveying device as set forth in claim 3, wherein the second detecting unit is a second vision sensor.

* * * * *